Figure 2:
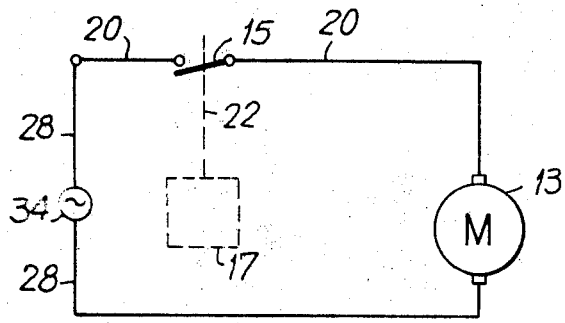

United States Patent

[11] 3,578,774

| [72] | Inventor | Harold P. McDonald, Jr.<br>Garden City, N.Y. (University of Tenn.<br>College of Medicine, Urology Dept. 858<br>Madison Ave., Memphis, Tenn. 38103) |
|---|---|---|
| [21] | Appl. No. | 848,170 |
| [22] | Filed | Aug. 7, 1969 |
| [45] | Patented | May 18, 1971 |

[54] UROLOGICAL ENDOSCOPIC IRRIGATION MACHINE
8 Claims, 2 Drawing Figs.

[52] U.S. Cl. ................................................. 128/227, 137/403
[51] Int. Cl. ................................................. A61m 7/00
[50] Field of Search .......................................... 128/214, 227; 137/394, 403, 408, 38; 222/25, 52, 56, 77; 210/496, 500; 128/2, 230, 349

[56] References Cited
UNITED STATES PATENTS

| 1,746,510 | 2/1930 | Adamson | 128/227 |
|---|---|---|---|
| 2,478,876 | 8/1949 | Nelson | 128/227 |
| 2,775,205 | 12/1956 | Gunther | 137/403X |
| 2,879,207 | 3/1959 | Poitras | 128/214UX |
| 3,107,745 | 10/1963 | Bujan | 128/214UX |
| 3,242,924 | 3/1966 | Kraft | 128/227X |
| 3,329,147 | 7/1967 | Barron | 128/349(R)X |
| 3,425,415 | 2/1969 | Gordan | 128/214 |

OTHER REFERENCES
THE LANCET, "New Inventions," October 15, 1960, p. 851.

*Primary Examiner*—Richard A. Gaudet
*Assistant Examiner*—Jack C. McGowan
*Attorney*—Allison C. Collard

ABSTRACT: A urological endoscopic irrigation machine which consists of a cabinet for holding tank of irrigation fluid which is pumped through a tube into a reservoir bag at an elevated height. A membrane filter is connected on the input of the bag to filter out bacteria from the irrigant pumped from the tank. The bag is supported from a weight-sensitive switch which is responsive to the weight of the bag and its contents so that, as the fluid level in the bag drops, the weight-sensitive switch will automatically operate the pump to refill the bag to a predetermined level so as to maintain its constant supply of irrigation fluid for the patient.

PATENTED MAY 18 1971

3,578,774

INVENTOR.
HAROLD P. McDONALD, Jr.

BY *[signature]*

ATTORNEY

UROLOGICAL ENDOSCOPIC IRRIGATION MACHINE

This invention relates to a urological irrigation apparatus for use during endoscopy of the bladder and urethra or for postoperative therapy of the patient.

More specifically, this invention relates to a urological irrigation apparatus which is capable of utilizing as an irrigant an available supply of water or other aqueous solutions and, after filtration, providing it in measured amounts to the patient during endoscopy or postoperative therapy.

Conventional devices which provide an irrigation solution for urological endoscopy are presently considered inefficient. In one type of system Valentine flasks, which are bulky, fragile and awkward, are sterilized and are filled with a sterile fluid for connection to the patient. The top of the Valentine flasks generally remains open so that organisms from the environment can contaminate the fluid contained within the flasks. Moreover, when the Valentine flasks run out of fluid, it is necessary to refill the flasks by adding sterilized irrigation fluid from heavy, bulky bottles which have to be lifted above head height in order for their contents to empty into the flasks.

In another conventional system which attempts to overcome the above-described disadvantages, commercially prepared solutions are provided in large disposable containers and must be stored under controlled conditions. These containers occupy valuable hospital space before they are utilized. Many conventional devices combine some of the features of both of the above-described apparatus and have been found to be complex and excessively expensive for occasional hospital use.

Accordingly, the present invention overcomes many of the above-described disadvantages of conventional devices by providing an irrigation apparatus which is capable of using as an irrigant an available supply of nonpyrogenic hospital distilled water in controlled amounts. Moreover, if the endoscopist chooses, he may add to the irrigating fluid any additive such as glycine, sorbitol, mannitol or combination thereof to the irrigating fluid before it is provided to the patient. The apparatus of the subject invention consists in part of a receptacle tank for storing the irrigation fluid and a pump for elevating quantities of the fluid to a reservoir bag for introduction to the patient. The reservoir bag includes at its input a membrane filter, such as a Millipore sterilizing filter composed of biologically inert cellulose esters of controlled microscopic size, which is capable of removing all bacteria from the fluid which passes through the filter into the reservoir bag. The reservoir bag is suspended at an elevated height above the patient from a weight-sensitive control system which detects the weight of the fluid contained within this bag. The pump is electrically connected to the weight-sensitive switch so that when the level of the irrigation fluid within the reservoir bag becomes low, the weight-sensitive switch will operate the pump and advance additional amounts of fluid from the receptacle tank through the filter into the reservoir bag. The weight-sensitive switch is adjusted so that the reservoir bag is only partially filled at all times, leaving an air space at the top portion of the bag so as to capture any air bubbles contained in the irrigation fluid pumped into the bag. A tube, which is connected to the bottom of the bag, permits only irrigation fluid to flow by gravity through an endoscope on the end of the tube to the patient.

It is therefore an object according to the present invention to provide an endoscopic irrigation apparatus which permits the use of an available supply of irrigation fluid for use in postoperative therapy or endoscopy.

It is another object, according to the present invention, to provide an endoscopic irrigation apparatus which is simple in design, easy to manufacture and reliable in operation.

Other objects and features of the present invention will become apparent from the following detailed description considered in connection with the accompanying drawing which discloses one embodiment of the present invention. It is to be understood, however, that the drawing is designed for the purpose of illustration only, and not as a definition of the limits of the invention.

Figure 1:
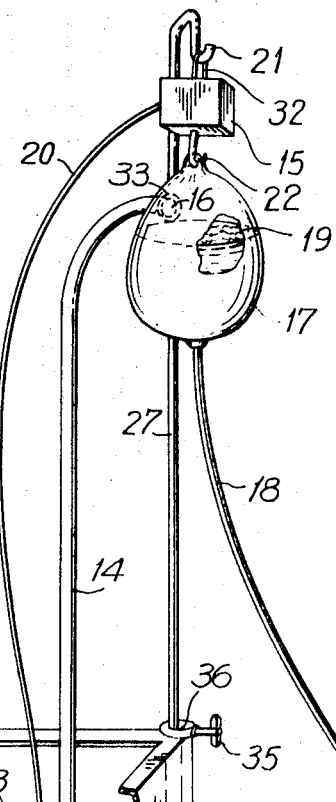
Figure 1:
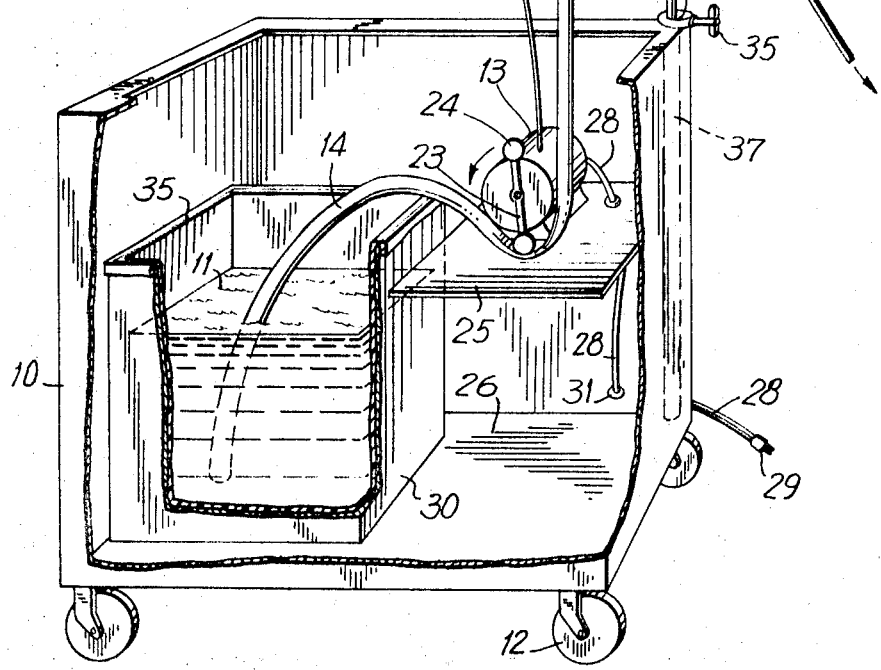

In the drawing, wherein similar reference characters denote similar elements throughout the several views:

FIG. 1 is a perspective view, slightly in cross section of the apparatus according to the invention; and FIG. 2 is an electrical schematic diagram of the operation of the apparatus of FIG. 1.

Referring to FIGS. 1 and 2, there is shown the apparatus according to the invention contained and supported by a cabinet 10 mounted on casters 12 disposed on each corner of the cabinet. Cabinet 10 includes four sidewalls and is generally open at the top to receive a receptacle tank 30 which is supported by the cabinet's floor 26. Receptacle tank 30 only partially occupies the interior of cabinet 10 and can store a substantial quantity of irrigation fluid 11. Tank 30 includes a disposable plastic liner 35 which completely covers its internal wall surfaces so that fluid irrigant 11 is completely contained in the plastic liner. A tube 14 is disposed at one end within fluid 11 contained in tank 30 and passes in contact with a roller pump 13. Pump motor 13 includes a rotor 23 secured on its output shaft having a pair of rollers 24 on the ends of the rotor arms which rotate in the direction of the arrow as shown so as to partially compress tube 14 in order to advance the fluid irrigant 11 into a reservoir bag 17. It is obvious that pump 13 need not be a roller type pump but may consist of any conventional type pump which does not contaminate the fluid within tube 14 as it is pumped into bag 17.

Tube 14 is connected adjacent to the top of bag 17. Connected on the end of tube 14 near the top of bag 17 is a filter 16, which is preferably a molecular filter such as a Millipore filter, which contains millions of microscopic porous membranes of uniform size composed of pure and biologically inert cellulose esters. In one embodiment of the invention, the filter utilized had a pore size of 0.22 microns ± 0.02 microns. Therefore, all particles contained in fluid 11 which are larger than 0.22 microns are filtered from the solution. This particular filter absolutely removed all bacteria from the fluid passing through it.

Disposed adjacent to the top of bag 17 is a weight-sensitive switch 15 having a hook 22 which is secured to the top of bag 17. Weight-sensitive switch 15 may consist of a conventional contact switch which is normally closed and can be set so that its contacts will open when a predetermined weight is connected to hook 22. A U-shaped strap 32 is connected to the top of switch 15 to support the weight of the switch and bag 17 from a hook 21 mounted on the end of a vertical support member 27. Support member 27 is disposed along one sidewall of cabinet 10, preferably adjacent to one of its corners. Vertical support rod 27 is made adjustable in height in order to vary the pressure of the fluid applied to the patient. Support rod 27 is preferably telescoped into a tube 37 secured along the side of cabinet 10, and may be secured to a fixed height position by means of tightening wingbolt 35 contained on clamp 36, at the end of tube 37. The contacts of switch 15 are electrically connected to two wire conductor 20 which is connected to electrical pump motor 13. Electric pump motor 13 is also connected to powerline 28 which passes through an opening 31 on the side of cabinet 10 and terminates in plug 29. Plug 29 may be connected to any standard electrical power source such as 110 volts, 60 cycles, AC.

As shown in detail in FIG. 2, one side of conductor 28 is electrically connected to one wire of conductor 20 which leads to switch 15. The other side of conductor 20 connects to one input of motor 13 so as to complete the electrical circuitry for operating the pump.

In the operation of the apparatus of FIG. 1, an irrigant fluid 11, such as nonpyrogenic hospital distilled water, which is ordinarily available in unlimited supply, is added to tank 30. In a preferred embodiment of the invention, tank 30 was designed to hold 5 gallons of the irrigant fluid. Weight-sensitive switch 15 is preset so that pump 13 will operate to only partially fill reservoir bag 17 with fluid 19, consisting of irrigant fluid 11 filtered through filter 16. Air bubbles which are contained within the irrigant 11, supplied through tube 14, would ordinarily block the microscopic porous membranes of filter 16. Filter 16 includes a hydrophobic rim 33 surrounding the filter which allows the air to pass through the filter without the problem of air locks. The air bubbles are caught at the top of the reservoir bag apart from filtered fluid 19. When fluid 19 reaches a predetermined level within bag 17, preferably below filter connection 16, the combined weight of fluid 19 and the weight of bag 17 will cause the contacts of switch to open circuit, so as to disconnect pump 13 from electrical power source 34. In one preferred embodiment, switch 15 was automatically set to stop pump 13 when reservoir bag 17 was filled with 2,500 cubic centimeters of fluid. The fluid can then be drained by gravity through tube 18 which is connected to the bottom of bag 17. The end of the tube 18 is connected to the endoscopic instrument for connection to the patient undergoing postoperative therapy.

Tube 14 may consist of polyurethane tubing. Bag 17 consists of a disposable closed collapsible plastic bag reservoir. The plastic liner in receptacle tank 30 is changed prior to starting the first case of the day. The Millipore filter 16, plastic bag reservoir 17, and tubing 18 are all prepackaged in a sterile container, and replaced after use with each patient.

The above-described apparatus has a number of distinct advantages over conventional irrigation systems. The enclosed plastic bag maintains the sterility of the fluid irrigant supplied to the patient from the endoscopic instrument. The apparatus permits the flow rate to be adjusted by varying the height of reservoir bag 17 on rod 27. The apparatus is easy to operate, and requires a minimum of handling by hospital personnel. The filling of the reservoir bag is automatically controlled, so that there are no annoying interruptions of the endoscopic procedure as the fluid level of the bag begins to drop. There is also no cleanup problem, since the reservoir bag, filter, and drain tube 18 are discarded after each case. Tube 14, if constructed from polyurethane, need only be replaced approximately once a year. None of the components require sterilization before the apparatus is ready for use. The apparatus takes up very little storage space in the hospital, and no storage space is required for additive solutions and the disposable filter and reservoir components. The apparatus has been tested with a large number of patients and has met with substantial success in treating the patients after surgery.

While only a single embodiment of the present invention has been shown and described, it will be understood that many changes and modifications may be made thereunto without departing from the spirit and scope of the invention.

I claim:

1. An irrigation apparatus for dispensing fluid to an endoscopic instrument comprising;
   receptacle tank means for storing a quantity of the fluid,
   reservoir container means for holding a measured quantity of the fluid,
   means for maintaining said reservoir container at an elevated height above said receptacle tank,
   weight-sensitive switch means for securing said reservoir container to said maintaining means,
   pump means connected to a source of power with said switch means interposed between said pump and said source of power whereby actuation of said switch means transfers quantities of fluid from said receptacle tank to said reservoir container,
   membrane filter means secured on the input of said container means and connected to the output of said pump and an endoscopic instrument connected to the output of said container means.

2. The apparatus as recited in claim 1 wherein said receptacle tank means additionally comprises a plastic liner for completely covering the internal walls of the tank.

3. The apparatus as recited in claim 1 wherein said filter means comprises a sterilizing Millipore filter.

4. The apparatus as recited in claim 3 wherein said Millipore filter comprises a hydrophobic rim surrounding said filter for removing the air from the fluid.

5. The apparatus as recited in claim 1 wherein said maintaining means comprises an adjustable vertical support member secured adjacent to said receptacle tank means.

6. The apparatus as recited in claim 5 wherein said reservoir container means comprises a disposable bag for replacement after use.

7. The apparatus as recited in claim 1 additionally comprising a portable cabinet for containing said receptacle tank means, said pump means, and for mounting said maintaining means in a vertical position.

8. The apparatus as recited in claim 1 wherein said pump means comprises; a motor, a rotor connected to the output of said motor, rollers pivotably connected to the arms of said rotor, and a tube connected between said tank means and said container means and in compressible contact with said rollers so that the movement of said rollers over said tube advances the fluid from said tank means to said container means.